US012591725B2

(12) United States Patent
Ray et al.

(10) Patent No.: US 12,591,725 B2
(45) Date of Patent: Mar. 31, 2026

(54) AUTOMATED SYNTHESIS OF VIRTUAL SYSTEM-ON-CHIP ENVIRONMENTS

(71) Applicant: University of Florida Research Foundation, Inc., Gainesville, FL (US)

(72) Inventors: Sandip Ray, Gainesville, FL (US); Tashfia Alam, Gainesville, FL (US); Indira Bhoomareddy Ramaiah, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 644 days.

(21) Appl. No.: 18/170,316

(22) Filed: Feb. 16, 2023

(65) Prior Publication Data

US 2023/0267253 A1 Aug. 24, 2023

Related U.S. Application Data

(60) Provisional application No. 63/312,469, filed on Feb. 22, 2022.

(51) Int. Cl.
*G06F 30/30* (2020.01)
*G06F 30/31* (2020.01)
(Continued)

(52) U.S. Cl.
CPC ............ *G06F 30/337* (2020.01); *G06F 30/31* (2020.01); *G06F 30/3308* (2020.01);
(Continued)

(58) Field of Classification Search
None
See application file for complete search history.

(56) References Cited

U.S. PATENT DOCUMENTS 10,146,463 B2 * 12/2018 Hussain ................ G06F 3/0637
10,235,211 B2 * 3/2019 Goyal ................... G06F 9/5077
(Continued)

OTHER PUBLICATIONS

C.-Y. (Ric) Huang et al., "SoC HW/SW Verification and Validation," 2011 IEEE, 3D-2, pp. 297-300. (Year: 2011).*
(Continued)

*Primary Examiner* — Leigh M Garbowski
(74) *Attorney, Agent, or Firm* — Thomas I Horstemeyer, LLP

(57) ABSTRACT

The present disclosure presents systems and methods performing a simulation on a hybrid virtual system-on-chip (SoC) model. One such method comprises receiving a configuration file that identifies register transfer level (RTL) abstractions; virtual prototype abstractions; unit-level testbenches; place holder variables; and a shared interface among one or more hardware circuitry blocks designed as RTL abstractions and one or more hardware circuitry blocks designed as virtual prototype abstractions; creating the hybrid virtual SoC model based on the configuration file by instantiating the one or more hardware circuitry blocks designed as RTL abstractions and a stub hardware circuitry block for each of the one or more hardware circuitry blocks
(Continued)

designed as virtual prototype abstractions; and integrating unit-level testbenches for the one or more hardware circuitry blocks represented as RTL abstractions.

20 Claims, 9 Drawing Sheets

(51) Int. Cl.
| | |
|---|---|
| *G06F 30/3308* | (2020.01) |
| *G06F 30/333* | (2020.01) |
| *G06F 30/337* | (2020.01) |
| G06F 115/02 | (2020.01) |
| G06F 115/08 | (2020.01) |
| G06F 117/08 | (2020.01) |

(52) U.S. Cl.
CPC ........ *G06F 30/333* (2020.01); *G06F 2115/02* (2020.01); *G06F 2115/08* (2020.01); *G06F 2117/08* (2020.01)

(56) References Cited

U.S. PATENT DOCUMENTS

| | | | | |
|---|---|---|---|---|
| 2011/0106522 A1* | 5/2011 | Chinya | ............... | G06F 9/45533 703/28 |
| 2020/0117843 A1* | 4/2020 | Ledzius | ................. | G06F 30/30 |
| 2022/0019720 A1* | 1/2022 | Bhunia | ................. | G06F 30/327 |
| 2024/0143383 A1* | 5/2024 | Barreto | ............... | G06F 9/45533 |

OTHER PUBLICATIONS

A. Horn et al., "Formal Co-Validation of Low-Level Hardware/Software Interfaces," authors and FMCAD Inc, pp. 121-128. (Year: 2013).*

Y. Abarbanel et al., "Validation of SoC Firmware-Hardware Flows: Challenges and Solution Directions," 2014 ACM/DAC, San Francisco, CA, 4 pages. (Year: 2014).*

W. Chen et al., "Challenges and Trends in Modern SoC Design Verification," IEEE Design&Test, Sep./Oct. 2017, pp. 7-22. (Year: 2017).*

P. Mishra et al., "Post-Silicon Validation in the SoC Era: A Tutorial Introduction," IEEE Design&Test, May/Jun. 2017, pp. 68-92. (Year: 2017).*

W. Kim et al., "Early Software Development and Verification Methodology Using Hybrid Emulation Platform," Language, 9 pages. (Year: 2017).*

A. Wicaksana et al., "Hybrid Prototyping Methodology for Rapid System Validation in HW/SW Co-Design," 2019 IEEE, pp. 35-40. (Year: 2019).*

A. Charif et al., "Fast Virtual Prototyping for Embedded Computing Systems Design and Exploration," Rapido '19, ACM 2019, 8 pages. (Year: 2019).*

J. Choi et al., "Early HW/SW Co-Verification Using Virtual Platforms," 2021 18th Int'l SoC Design Conference (ISOCC), IEEE, pp. 51-52. (Year: 2021).*

L. Masing et al., "A Hybrid Prototyping Framework in a Virtual Platform Centered Design and Verification Flow," IEEE Embedded Systems Letters, vol. 13, No. 1, Mar. 2021, pp. 1-4. (Year: 2021).*

* cited by examiner

Table 1
SIMULATION SPEED: VIRTUAL SoC ENVIRONMENT VS. RTL PLATFORM

| Use cases | Simulation Speed in VirSoC generated platform (second) | | | | | | Estimated RTL Simulation Speed (hour) |
|---|---|---|---|---|---|---|---|
| | Exp 1 | Exp 2 | Exp 3 | Exp 4 | Exp 5 | Average execution time | |
| VP Firmware uses RTL AES IP during secure boot for derivation of crypto keys | 7.359 | 7.229 | 7.372 | 7.910 | 8.113 | 7.596 | At least 28 years in each case |
| VP Firmware uses RTL DES3 IP during secure boot for derivation of crypto keys | 7.681 | 7.277 | 7.240 | 8.343 | 8.655 | 7.839 | |
| VP Firmware uses RTL IIR IP to perform filtering operation | 7.1631 | 7.233 | 7.453 | 7.882 | 8.220 | 7.590 | |
| VP Firmware uses RTL RAM IP to perform certain memory write and read operation | 7.194 | 8.317 | 7.203 | 7.56 | 8.39 | 7.732 | |

FIG. 8

AUTOMATED SYNTHESIS OF VIRTUAL SYSTEM-ON-CHIP ENVIRONMENTS

CROSS-REFERENCE TO RELATED APPLICATION

This application claims priority to co-pending U.S. provisional application entitled, "Automated Synthesis of Virtual System-on-Chip Environments," having Ser. No. 63/312,469, filed Feb. 22, 2022, which is entirely incorporated herein by reference.

BACKGROUND

Recent years have seen a significant rise in the amount and complexity of embedded software code integrated into System-on-Chip (SoC) designs, often blurring the boundaries between hardware, firmware, and software components. Software is now used to implement a variety of low-level functionality, such as fine-grained power management, authentication and update, protocols for interfacing with off-chip components, etc. A key advantage of realizing a system functionality through software instead of custom hardware is that software can be more easily updated or "patched" in field, in response to bugs or vulnerabilities detected after deployment or to changing security, functionality, or performance requirements during the lifetime of the system. The trend towards moving system functionality to software is anticipated to rise at an even sharper gradient in future, as time-to-market schedules continue to shrink resulting in a consequent shrinkage of verification time and consequent increase in escapes to deployment.

A key requirement for critical, low-level system software is that they must be functional at the same time that the hardware product is ready to ship. Consequently, development and validation of such software must proceed concurrently with the hardware development and cannot wait until a mature silicon is available. A key challenge in the early validation of such software is the availability of a mature hardware platform on which to run (and test) the software. It is noted that running the software on a previous generation SoC is not a viable approach-software implementing low-level system functionality is generally written to interact with various components of the targeted hardware which may not be available in a platform implementing a previous variant of the same SoC. On the other hand, running software workloads on an Register-Transfer Level (RTL) simulator is prohibitively expensive. Consequently, a fast hardware model on which to run software is not available until the hardware is mature enough for running on emulators or field-programmable gate array (FPGAs) (or early silicon), which can only occur late in the design life cycle.

The current industrial practice to address this problem is virtual platforms. The virtual platform (VP) of a hardware platform (P) is an abstract software model implementing the high-level functionality of P. Software intended to run on P is then developed and validated on VP. Unfortunately, the application of a virtual platform as a vehicle for developing or validating low-level system software is limited. In particular, since many internal details of P are abstracted or omitted in VP, subtle corner cases of hardware-software interactions are missed when running software on VP. Industry has attempted to address this problem through a variety of hybrid virtual platforms, which include the integration of certain functionality as hardware models, e.g., as RTL blocks while the rest of the functionality is in software prototypes. However, putting together a hybrid virtual platform in today's practice is a highly manual and time-consuming exercise, often taking weeks to months. Furthermore, different hybrid platforms are required for validation of different software. For instance, if a software functionality involves configuring the cryptographic units for specific operation modes, then it is critical that, in the hybrid platform used for developing and validating the software, the cryptographic engine intellectual property (IP) is integrated with a low-level (RTL or netlist) implementation. On the other hand, if the software is a computer vision implementation, then the IPs required with low-level implementation may include a digital signal processing (DSP) accelerator and vector processing units. Developing and maintaining such hybrid virtual platforms represents a complex, expensive, and time-consuming bottleneck for early software development and validation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is a table providing a comparison of simulation speed between an exemplary Virtual SoC environment and an RTL platform.

DETAILED DESCRIPTION

Figure 1:
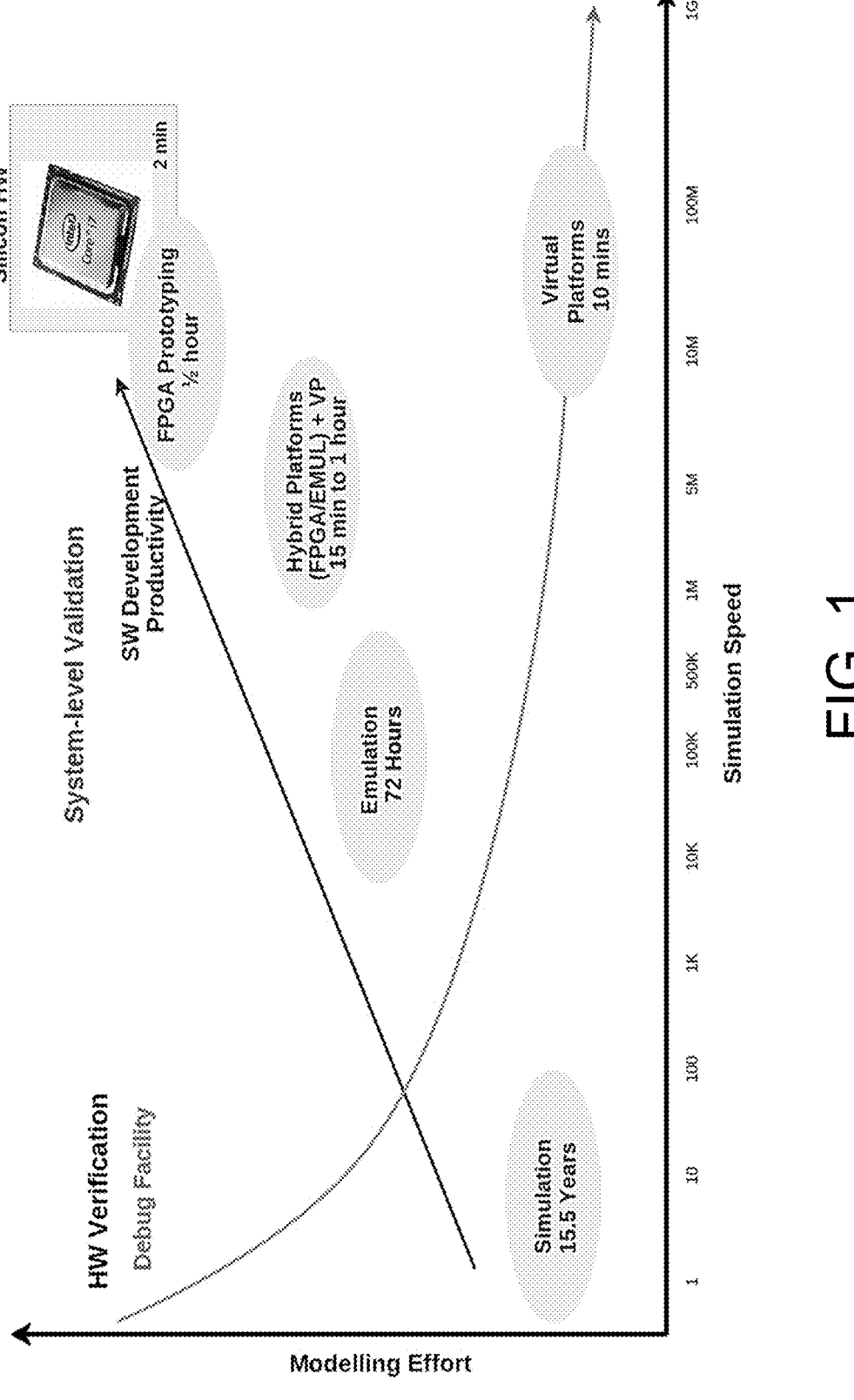
FIG. 1 is a chart comparing different validation platforms in view of modeling effort and simulation speed.

The concepts described herein are directed to methods and systems for an automated synthesis of Virtual System-on-Chip (SoC) environments that can integrate design blocks at software, hardware, and silicon implementations. Accordingly the present disclosure presents a novel infrastructure Virtual SoC (VirSoC) environment that is configured to automatically generate virtual prototyping environments, namely hybrid virtual platforms that integrate components in software and hardware (e.g., RTL/netlist) abstractions. In various embodiments, the VirSoC environment includes an architecture and computer-aided design (CAD) flow to integrate different design blocks available in different abstraction levels to create a coherent, uniform view of SoC-functionality that is suitable for early software validation.

Although the virtual SoC (VirSoC) environment is composed of a collection of heterogeneous components at different levels, the heterogeneity in abstraction of the underlying components is hidden from the user of the platform such that the user is provided with the unified view of an integrated SoC platform on which to run software targeted for early validation. To the inventors' knowledge, VirSoC environment presents the first automated flow for generating hybrid virtual platforms with heterogeneous intellectual property (IP) collateral.

One key idea behind VirSoC is the observation that IP components integrated into an SoC generally include validation testbenches in addition to the implementation of the IP functionality. The traditional role of a testbench is to enable smooth and systematic application of test inputs for validation of the IP components. However, an indirect characteristic of any testbench is the ability to translate inputs typically provided as transaction-level collateral into a form that can exercise the target IP. VirSoC exploits this observation to create an SoC-level testbench from those of the individual IPs that is then exploited as a conduit for interfacing modules in a virtual platform (VP) with IPs in RTL.

Functional validation in the pre-silicon phase is a crucial component in the SoC development flow to ensure the correct functionality of the overall system. With the growing design complexity, verification tasks have shifted towards targeting certain applications rather than ensuring full functional coverage to avoid scalability issues and other relevant costs. However, there has been a rising trend toward defining critical functions in software involving tight coupling with hardware. Consequently, it is not easy to define a coherent hardware specification without the associated software. This kind of interaction validation is critical in ensuring correct system functionality. Therefore, to render an SoC functional and secure, one must account for the verification of individual components as well as their integration (including HW-SW interactions) before the product ships. However, exercising system-level use-cases requires a reasonably mature hardware platform acquired later in the product life cycle. While it is challenging to perform such co-validation because of their heterogeneous nature and lack of a universal validation platform, standalone validation of software or hardware components is not feasible due to the shared interfaces. Specification errors found after the product ships add to the validation difficulty. Furthermore, IPs developed by third-party IP vendors provide different design representations/abstractions, causing system-level validation to be challenging.

The continual shrinkage of the verification timeline has led the system developers to adopt different platforms to perform validation earlier in the product life-cycle, such as Emulators, FPGAs, and virtual prototypes. However, they trade off different parameters of interest, including simulation speed, design abstraction, and modeling effort. FIG. 1 presents a sample modeling effort versus simulation speed measurement for state-of-the-art validation platforms. The conventional RTL simulation provides a detailed (low-level) description of the target hardware, rendering it suitable for hardware debugging. Although RTL simulation provides hardware accuracy, it cannot offer high simulation speed, especially as it becomes very slow for embedded software execution. Putting the RTL description into emulation is another solution, while the Emulator reproduces the functionality of an IP or SoC and offers reasonably high emulation speed with a substantial amount of scalability. However, emulation requires extensive effort and cost and might not be a reasonable solution for IP-level verification. FPGA prototyping provides simulation speed comparable to real silicon execution speed that facilitates embedded software validation. However, FPGA prototyping is a challenge to perform hardware debugging on such platforms. Additionally, the number of input/output ports in FPGAs may restrict the scope of SoC implementation, thereby incurring high resource costs. In contrast, virtual prototypes are widely used validation platforms that offer high simulation speed and software debugging facilities at a lower cost (see FIG. 1). Virtual prototypes are software-based models that replicate the functionality of any target hardware, such as IP, SoC, and board and enable early system validation by providing an executable hardware representation. Hence, there have been extensive applications of virtual prototypes in dynamic validation, simulation-based strategies, and even formal analysis for SoC development. However, one challenge yet remains. Since a virtual prototype provides an abstract representation, it lacks detail and can miss the corner cases from HW-SW interactions, making it unsuitable for hardware debugging or exploring corner cases. The proposed solution to this problem is using a Hybrid Virtual Platform. Although a hybrid virtual platform requires a relatively higher modeling effort, it can provide a better debugging environment for system-level HW-SW interactions in the pre-silicon phase.

As the name goes, a hybrid virtual platform includes different prototyping solutions in an integrated environment. As such, a hybrid virtual platform comprises hardware IPs at different abstractions, such as RTL, virtual prototype, FPGA, and (n−1) silicon, enabling the utilization of each IP associated with the system regardless of its abstraction. The advantage of such a platform is achieving high simulation speed by leveraging virtual prototypes and accuracy from a detailed hardware implementation as required. Besides, designers can trade simulation speed and design details using a hybrid environment. Consequently, these platforms can be configured where simulation speed plays a crucial role. However, there are some challenges in integrating IPs in different abstractions. The reason behind this is, as expected, the heterogeneous nature of the platforms. Interfacing the same type of prototypes is already defined, but connecting different abstractions requires custom methodologies. For example, integrating an RTL IP with a virtual prototype is challenging due to the difference in the design description. Consider that the RTL defines a clock port, whereas the VP does not, which requires a transactor to translate data into a respective abstraction to enable communication. A second challenge is the speed mismatch. For example, RTL simulation is some orders of magnitude slower than VP execution (see FIG. 1), which leads to a performance bottleneck. Correspondingly, virtual prototypes and IPs implemented in FPGAs differ in design description and simulation speed. Eventually, a hybrid platform with an appropriate interface among various abstractions will be most helpful in early system validation. However, it requires comprehensive human effort to manually integrate IPs whenever there is a new RTL drop or FPGA drop in industrial practice. Although some system-level virtual platforms exist, automated integration of multiple abstractions in an SoC environment has never been addressed. Nevertheless, due to the lack of such environments, it is challenging to perform early validation, in some cases, exercised after real silicon is available.

An exemplary solution of the present disclosure addresses the mentioned challenges with the current prototyping solutions by forming an SoC-based hybrid virtual environment (VirSoC) that can incorporate IPs at different abstractions. VirSoC enables an automated flow for creating such SoC environments. In addition, VirSoC provides proper interfaces among the IPs, including virtual prototypes that act as an SoC environment, thus enabling the execution of embedded software and performing early validation. The first step in forming the SoC environment is creating SoCs with IPs in the same abstraction (e.g., RTL and FPGA), thereby allowing a user to provide desired specifications to create an SoC environment from IPs at different representations. Then, it extends it to an SoC environment by connecting the SoC(s) and IPs in other (such as virtual) abstractions, for instance, connecting the virtual components with the RTL components (SoC) through a shared interface. Such framework lets users exercise several use-cases in the generated SoC environment as well.

Since VirSoC is trying to establish a communicating bridge among the clock-less virtual prototypes and clocked-RTL IPs, FPGAs, or silicon in an SoC, the primary challenge is to combine these abstractions. One feature of VirSoC is using a testbench for this purpose. Testbenches, as we know, are provided with the designs to be validated. Conventionally, these testbenches are used to test for the functionality of the IP with the help of standard inputs. In accordance with the present disclosure, these inputs are replaced in the testbench to test the design for desired inputs, and it avoids all the data formatting while communicating from IPs from one level of abstraction to another. Similarly, an exemplary platform integrates "stub" IPs available in the system to enable communication from the (RTL) SoC to VPs opaque to other IPs.

An exemplary and non-limiting setup for a VirSoC prototype tool rests on a Host machine, Ubuntu 18.04 (Host OS), and a Guest machine, Ubuntu 16.04 (Guest OS). For communication and data exchange purposes, the Host and Guest machines are connected through a communication protocol, such as a shared space. The host machine hosts the hardware components and the guest machine hosts the virtual components. The user who wishes to create a custom virtual SoC using the VirSoC prototype tool provides a configuration file with the specifications of the platform. The configuration file can carry the following information:

IP libraries of the virtual SoC in different abstractions (RTL, VP, FPGA);
Pointer to standard IP-level testbenches; and
Communicating Interface among the IPs in different abstractions.

Figure 2:
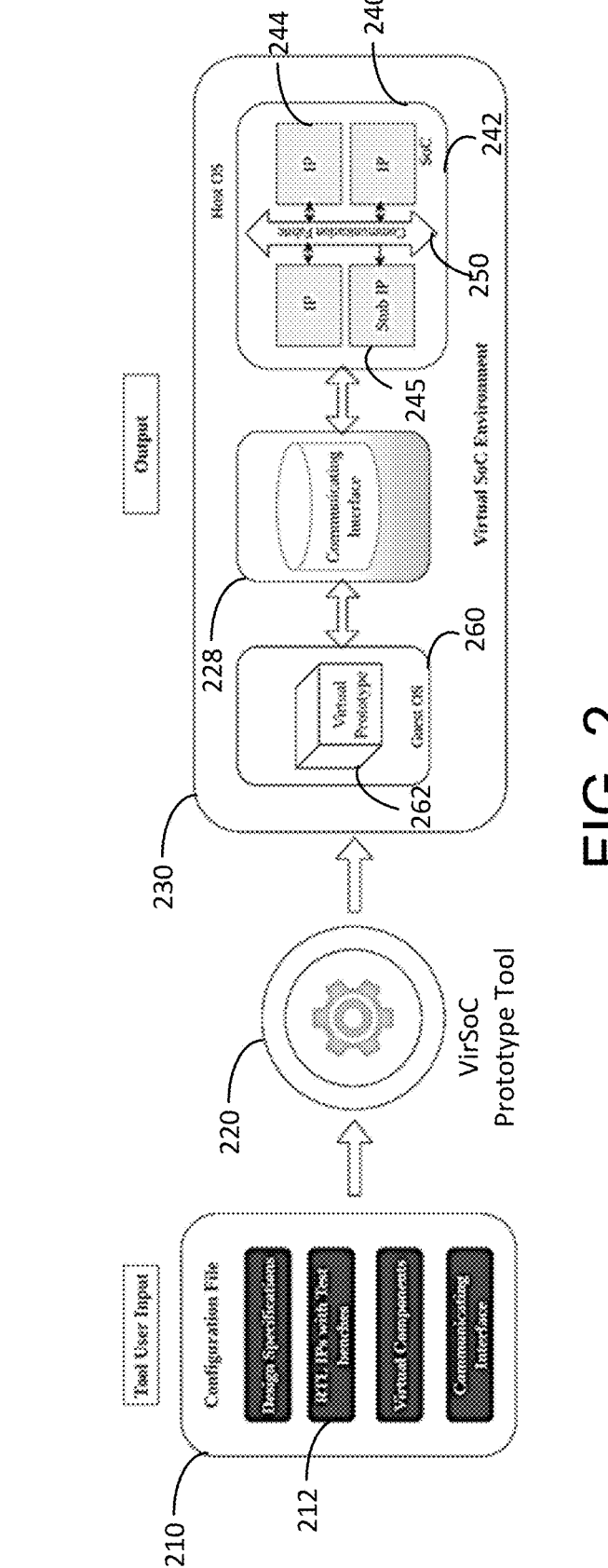
FIG. 2 shows an exemplary system for forming a Virtual System-on-Chip (VirSoC) in accordance with various embodiments of the present disclosure.

FIG. 2 shows an exemplary system 200 for forming a virtual SoC (VirSoC system 200) in accordance with various embodiments of the present disclosure. The setup and the components in a configuration file 210 (e.g., user inputs) are used to generate the VirSoC platform and is used as input to the VirSoC prototype tool 220, assuming that there is a communicating interface 228 among the different abstractions. Additionally, the user can specify in the configuration file 210 IP libraries and unit-level testbenches 212 for each of these IPs that are supposed to be in RTL (either in HDL or implemented in FPGAs). Feeding of inputs to the testbenches from the virtual prototypes or other abstractions not represented in RTL format requires IP-level testbenches to be written in a standardized format and having placeholders for the inputs and replacing them during RTL simulation. To create the custom virtual SoC environment 230, required specifications in a configuration file 210 are provided to the prototype tool 220 that creates an interface among the IPs 244 hosted in the host machine 240. The IPs 244 in RTL include an IP additional to those specified in the configuration file 210 called a stub IP 245. The stub 245 is a dummy IP corresponding to each virtual component in the environment. The purpose of the stub IP 245 is to receive the computed results from the communication fabric 250 of the SoC 242 and provide them to the outside environment. Thus, for every virtual IP or prototype 262 of the virtual SoC hosted in the guest machine 260, the prototype tool 220 is configured to instantiate a stub IP 245 in the SoC interfaced with the RTL IPs 244 through the communication fabric 250.

Since the IPs 244 that the user would exercise are present in an SoC environment 242 along with stub IP 245, there has to be a pathway to send inputs to these IPs through the communication fabric 250. The IP-level testbenches 212 that come with the IP libraries can be modified to communicate with the IPs 244 through the communication fabric 250. To enable communications between the IPs, the prototype tool 220 forms an SoC 242 and an SoC-level testbench, including the test functions for all IPs 244 in the SoC 242 apart from the stub IP. Since the stub 245 acts only as a communication link between the SoC 242 and the outside environment, and there are no intentions of testing its functionality, the SoC-level testbench need not test for the stub IP functions. The prototype tool 220 includes an SoC compiler that generates an SoC 242 with the IPs 244 in RTL and the stub IP 245, representative of each VP in the environment connected via a communication fabric 250.

A purpose of the VirSoC generated SoC environments 230 is to serve as an execution or validation platform while the IPs 244 are retained at different maturity levels and/or different use-cases are exercised. Thus, a user can specify different inputs to the IP 244 or the SoC 242 the user wants to exercise. After the user provides inputs wanting to exercise use-cases on the platform, the VirSoC system 200 automates the data-flow mechanism in the SoC environment 242. Accordingly, every time the user provides inputs, this part of the framework gets executed. In various embodiments, the VirSoC system 200 provides a control-flow mechanism that regulates the data flow within the SoC environment 242, as discussed below.

The ideology for the control-flow mechanism is to use the generated platform for the exercise of any use-case without considering how the hardware components take the inputs. Since the user is in a different level of abstraction concerning the hardware, the user provides inputs as if they were coming from a virtual prototype or other abstractions. Accordingly, the testbench 212 mediates with the hardware components to interpret and convert these inputs to their format. The user is prompted for inputs, and these inputs, entered by the user, are propagated to the communicating interface 228 (e.g., moved into a shared space or in a place where the SoC 242 can pick it up). Every time there are new inputs to the platform, the SoC-level testbench 212 is simulated by updating those inputs in placeholder variables. For every new set of inputs from other IPs to the SoC, the prototype tool 220 invokes an HDL (Hardware Description Language) simulator to simulate the SoC-level testbench 212 with provided inputs. The SoC-level testbench 212 is then compiled to produce the respective output. This output is made available in the communicating interface 228 by the prototype tool 220. The IP/system in the other abstraction is then prompted to pick it up and display it to the user on the other side (virtual platform). On the other hand, when it is exclusively one-way communication, for instance, when the user is only performing a "write" operation in a memory IP in the SoC, the execution stops after the provided data have been written to the specific memory address.

Figure 3:
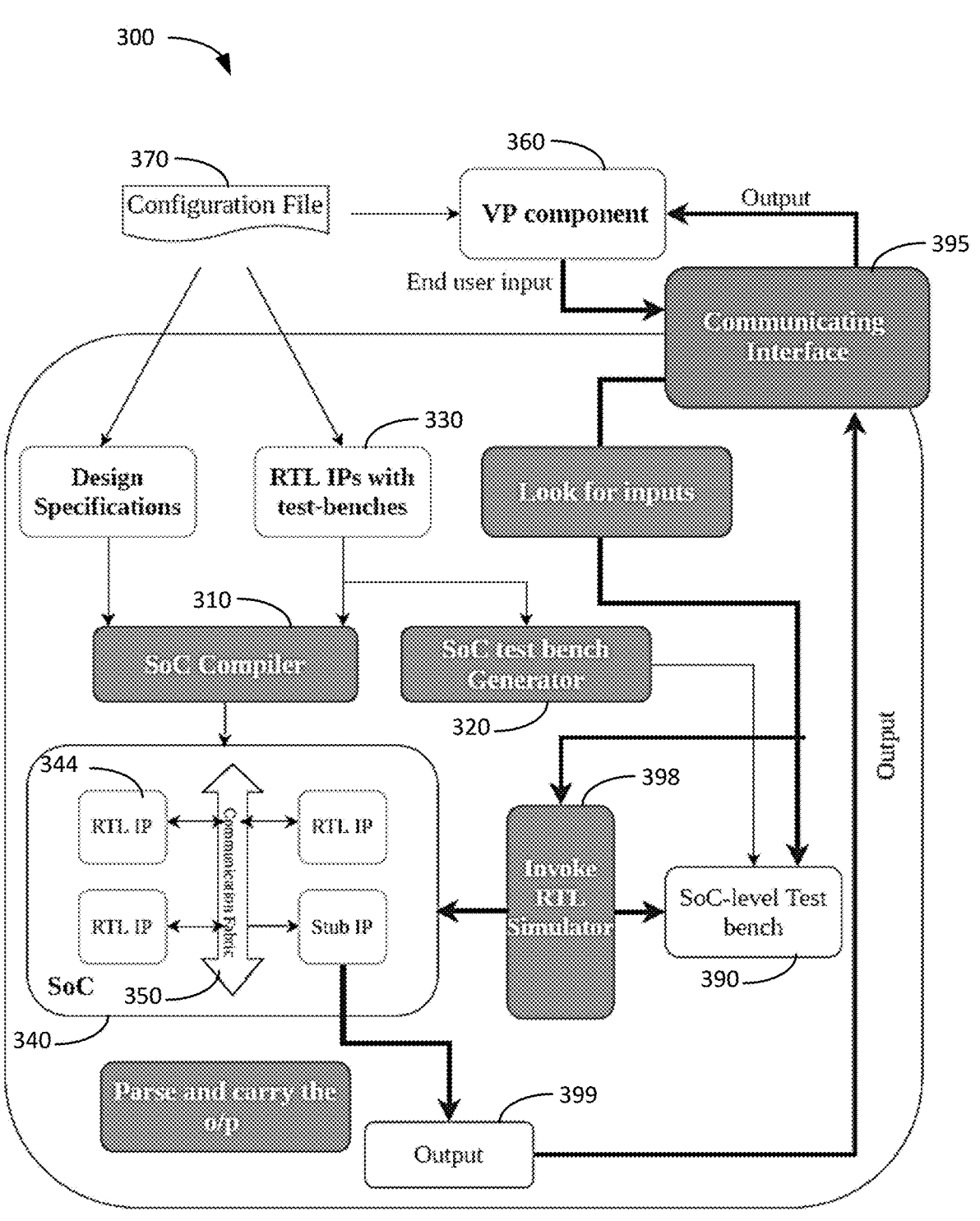
FIG. 3 shows VirSoC architecture and a description of the prototype tool flow in accordance with various embodiments of the present disclosure.

FIG. 3 depicts VirSoC architecture 300 and a description of the prototype tool flow from the user perspective, where the bold lines indicate the user interaction with the platform. As discussed, VirSoC enables automatic integration of different prototypes to form an SoC environment. To automatically generate and exercise such platforms, VirSoC incorporates several elements into the framework: SoC compiler 310, SoC-level testbench generator 320, and the automation framework of FIG. 2. The SoC compiler 310 combines the provided IP libraries in RTL 330 and forms an SoC 340 using the communication fabric 350, such as bus-based or NoC-based. A first task of the SoC environment formation is SoC generation with the IPs 344 available in RTL and the additional stub IPs 345 for each VP 360 in the system. The SoC compiler 310 generates an SoC 340 based on the specifications provided in the configuration file 370.

After the SoC generation, the prototype tool 220 generates an SoC-level testbench 390 to translate the incoming inputs to the format the SoC 340 receives. The testbench 390 acts as a middleman between the SoC 340 and the IPs in virtual abstractions 360. Generating an SoC level testbench 390 from the unit-level testbenches of various IPs is not trivial and requires the designer to consider a few factors-majorly the functions to be modified to carry signals to the fabric rather than individual IPs. The SoC-level testbench 390 should also distinguish the functions and the arguments coming from different IP-level testbenches to avoid conflict and have them initiated carefully to enable seamless communication from the outer environment to the SoC. VirSoC efficiently glues the IP-level testbenches to form an SoC-level testbench 390 taking care of these factors and enabling communication through the fabric 350. Eventually, relevant inputs from the configuration file 370 are used to simulate the SoC 340 according to the user specifications.

Automation enables the users to form the SoC environment and exercise use-cases seamlessly. Hence, the automation framework of the prototype tool 220 incorporates two control flows: invoking the SoC compiler 310 and SoC testbench generator 320 for virtual SoC environment generation and exercising use-cases. The first step is to read from the configuration file 370 and pass the information onto the SoC compiler 310 and SoC-level testbench generator 390. The necessary interface of the SoC 340 with the external environment is also created from the provided communicating interface 395. While exercising the platform by the user, the testbench's dummy inputs are replaced with the provided inputs in the placeholder variables. Then, an HDL/RTL simulator 398 is invoked to simulate the SoC in RTL with the testbench. The outputs dumped in the stub module's output ports are sliced by the automation framework, such that this part gets updated every time the number of outputs varies depending on the use-case being exercised. Correspondingly, the amount of bytes of outputs each IP level testbench produces is taken from the user, added for each IP, and updated in the tool. A value change dump parser dumps the computed output(s) 399 into the communicating interface 395 and is responsible for carrying the generated result from the output port 399 to the shared interface whenever the value changes in the output port 399. Thus, the computed results are forwarded to the communicating interface 395 from the SoC 340 to the sender IP in another abstraction.

VirSoC generated platforms can be useful for software debugging, such as firmware validation and exploring corner cases. Another advantage of this type of platform is that it allows writing software or micro-architecture on top of the platform at the pre-silicon phase. Thus, it creates scope for early software design or exploration, such as low-level driver software and software that enables post-silicon debugging.

In a first case study, the associated software application on the VP wants to use an (RTL) crypto engine during secure boot for deriving crypto keys. For this case study, we consider an AES (Advanced Encryption Standard) IP with other necessary IPs in RTL, a virtual prototype, QEMU-x86, which mirrors the x-86 processor's functionality, and a wishbone bus IP to act as a communication fabric in an SoC environment. We also consider that there is a shared space between the virtual components and the RTL components, and the processor commands the AES IP to compute a ciphertext upon providing a plain text and a key. The inputs are provided from the processor to the IPs via the SoC level testbench. Here, the VirSoC platform's creation requires providing the prototype tool with a comprehensive configuration file that contains all the information required by the prototype tool, including the name of the IPs that are to be present in the SoC, the location of the IP-level testbenches, headers, and other dependencies, if present. Additionally, the prototype tool requires information regarding the placeholders of the dummy inputs in the IP-level testbenches. Also, the details regarding the number of output bytes expected by each IP is present in the configuration file.

Once the prototype tool is invoked while creating the VirSoC platform, the configuration file location is requested. Upon execution of the prototype tool, it converts the user-provided configuration file to an intermediate configuration file required by the SoC compiler. Since the configuration file indicates a virtual IP (QEMU-x86), the information is placed in the intermediate configuration file to have a stub IP. Once the SoC is generated, the prototype tool moves on to generate the SoC-level testbench, and for this purpose, the prototype tool requires the IP-level testbench of AES IP and its dependencies. As discussed, the prototype tool will not need the stub IP's testbench. The prototype tool brings the functions of all the IP-level testbenches together, modifies the signals to go through the wishbone bus rather than having them go to the IPs directly, and generates the SoC-level testbench. The SoC-level testbench now contains input arguments that need to be replaced with the user-provided inputs. These inputs are provided to the prototype tool by the user. The automation framework receives the inputs that take the placeholder's information in the IP-level testbenches from the configuration file and the inputs from the other abstraction via the shared space. Finally, the user exercising this platform provides a plain text and a key received by the AES IP of the SoC from the virtual prototype. The SoC-level testbench of the VirSoc platform is updated with these inputs every time there are inputs for the platform in the shared space. This SoC level testbench is simulated using the provided plain text and the key, and the ciphertext is thus computed.

The stub IP is configured as a master IP and collects the computed outputs from the wishbone bus of the SoC. This ciphertext is then carried into the output port of the SoC. The time value of the output port is sliced using a Value Change Dump (VCD) file parser, and computed values at the required time at the SoC's output port are dumped into a text file which is then transported to the shared space. Finally, the user acting as the virtual prototype abstraction picks up the ciphertext from the shared space. Thus, the prototype tool completes the execution of a use-case including AES on a hybrid virtual platform or a virtual SoC environment.

Figure 4:
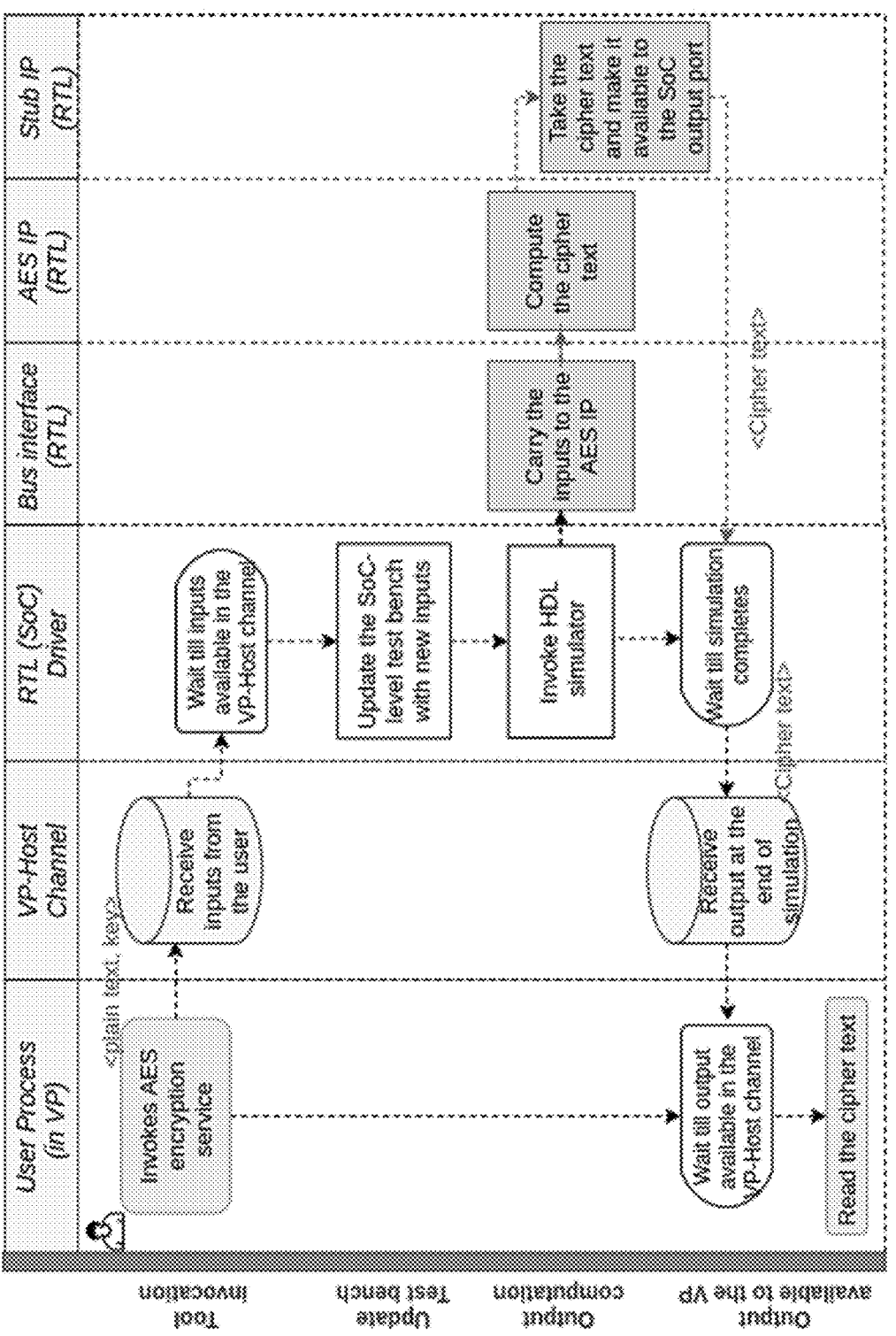
FIG. 4 is a flow diagram of a use case demonstration exercising AES IP (RTL) in accordance with embodiments of the present disclosure.

Accordingly, FIG. 4 demonstrates how a user exercises an encryption service leveraging a virtual SoC environment including AES IP (RTL). The flow diagram shows that an AES encryption service is invoked at a user process in VP, inputs are received from the user in a VP-Host channel, an RTL (SoC) Driver waits until inputs are available in the VP-Host channel, the RTL (SoC) Driver updates the SoC level testbench with new inputs, the RTL (SoC) Driver invokes an HDL simulator, a BUS (RTL) interface carries the inputs to the AES IP, the AES IP (RTL) computes the cipher text, a Stub IP (RTL) takes the cipher text and makes it available to the SoC output port, the RTL (SoC) Driver waits till simulation completes, the VP-Host Channel receives the output at the end of the simulation, the User Process waits until the output is available in the VP-Host channel, and the cipher text is output to the VP for reading.

Similarly, let us consider another use-case, whereas the QEMU-x86 VP firmware requires RTL DES-3 (Threefold Data Encryption Standard) IP as a crypto engine. Hence, the processor (VP) needs to provide the plain text and three keys for the DES-3 IP to compute the ciphertext. For the use-case, let's assume the communication fabric in the SoC is bus-based, and there is a shared space or a VP-Host channel between the virtual and RTL environments. After the platform creator invokes the prototype tool, it asks for the configuration file, including the information of the IPs, to be instantiated in the SoC environment. Next, the prototype tool counts the virtual components and includes a stub IP for each VP in the SoC. In this case, the prototype tool will instantiate one stub for the VP. Once the SoC is formed, the prototype tool integrates and extends the IP-level testbenches to the SoC level to enable sending inputs through the wishbone bus.

Figure 5:
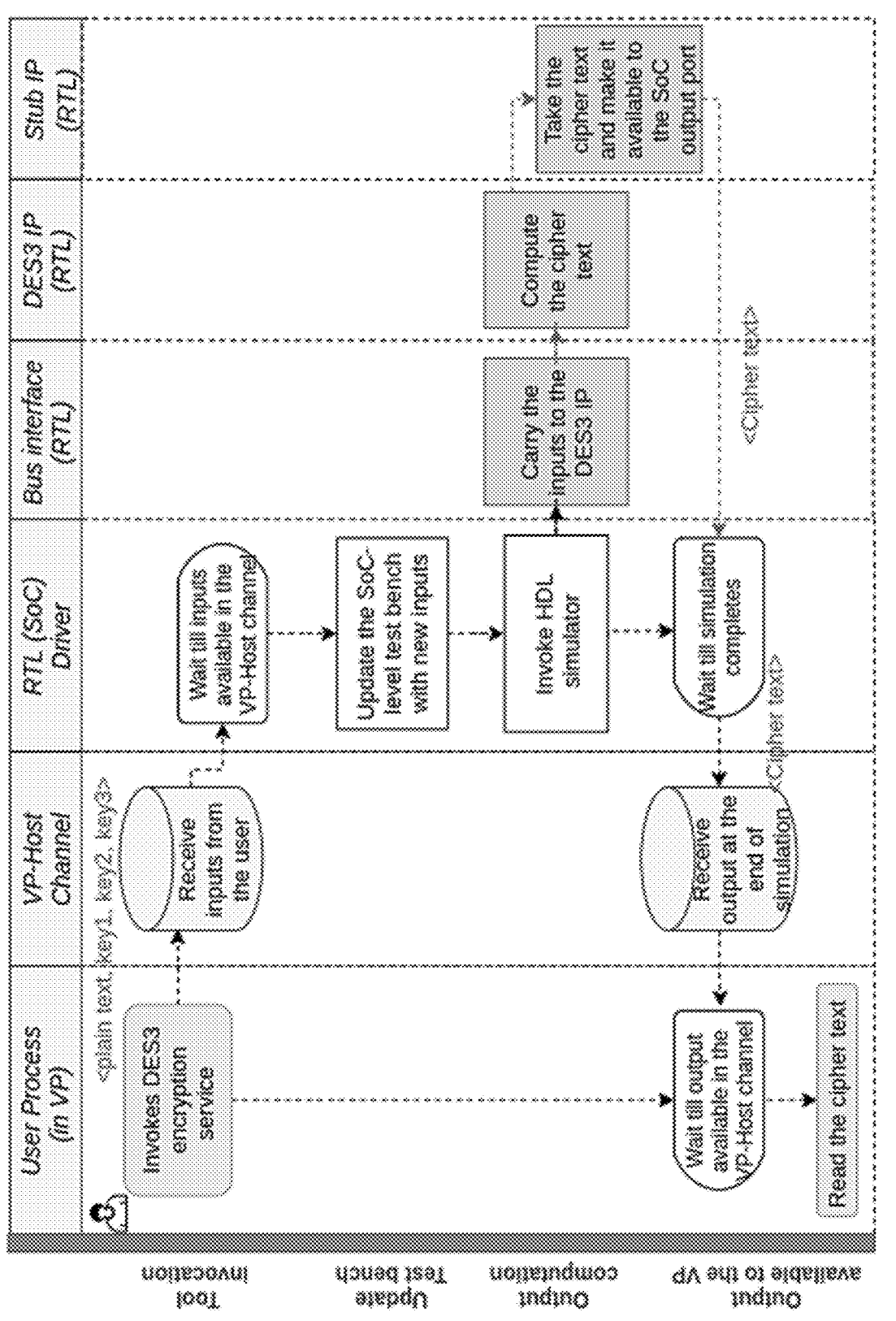
FIG. 5 is a flow diagram of a use case demonstration exercising DES-3 IP (RTL) in accordance with embodiments of the present disclosure.

FIG. 5 is a flow diagram demonstrating how a user exercises an encryption service leveraging a virtual SoC environment including DES-3 IP (RTL) in accordance with embodiments of the present disclosure. As shown in the figure, when the VirSoC platform is ready for the user to exercise the use-case employing the DES-3 IP in a virtual SoC environment, the user invokes the prototype tool while it prompts for the inputs. Upon providing the inputs, the prototype tool carries them from the virtual component to the SoC through the shared channel and passes it via the testbench. Next, the RTL simulator is invoked with the updated testbench populated with user-provided plain text and keys, thereby generating a ciphertext. The automation framework takes care of the next task, sending the ciphertext back to the processor or the virtual environment. Finally, the VP-Host channel receives the ciphertext from the stub and passes it to the user process in VP via the shared space.

Next, another use-case is considered that includes a RAM IP in RTL and an x-86 virtual prototype QEMU-x86 with a shared interface between the two systems (virtual platform and the Host) and a bus fabric for interfacing the RTL IPs. For this use-case, consider also that if the VP firmware wants to perform a read operation from the RAM IP, it must provide a specific address to the SoC environment it wants to read. After the user invokes the prototype tool to create the VirSoC platform, the prototype tool utilizes the configuration file that specifies the IP libraries, the amount of virtual components there are to instantiate a stub, and which IP to exercise to create an SoC-level testbench. The prototype tool immediately forms the SoC environment and SoC-level testbench utilizing this information and creates a pathway for data propagation.

Figure 6:
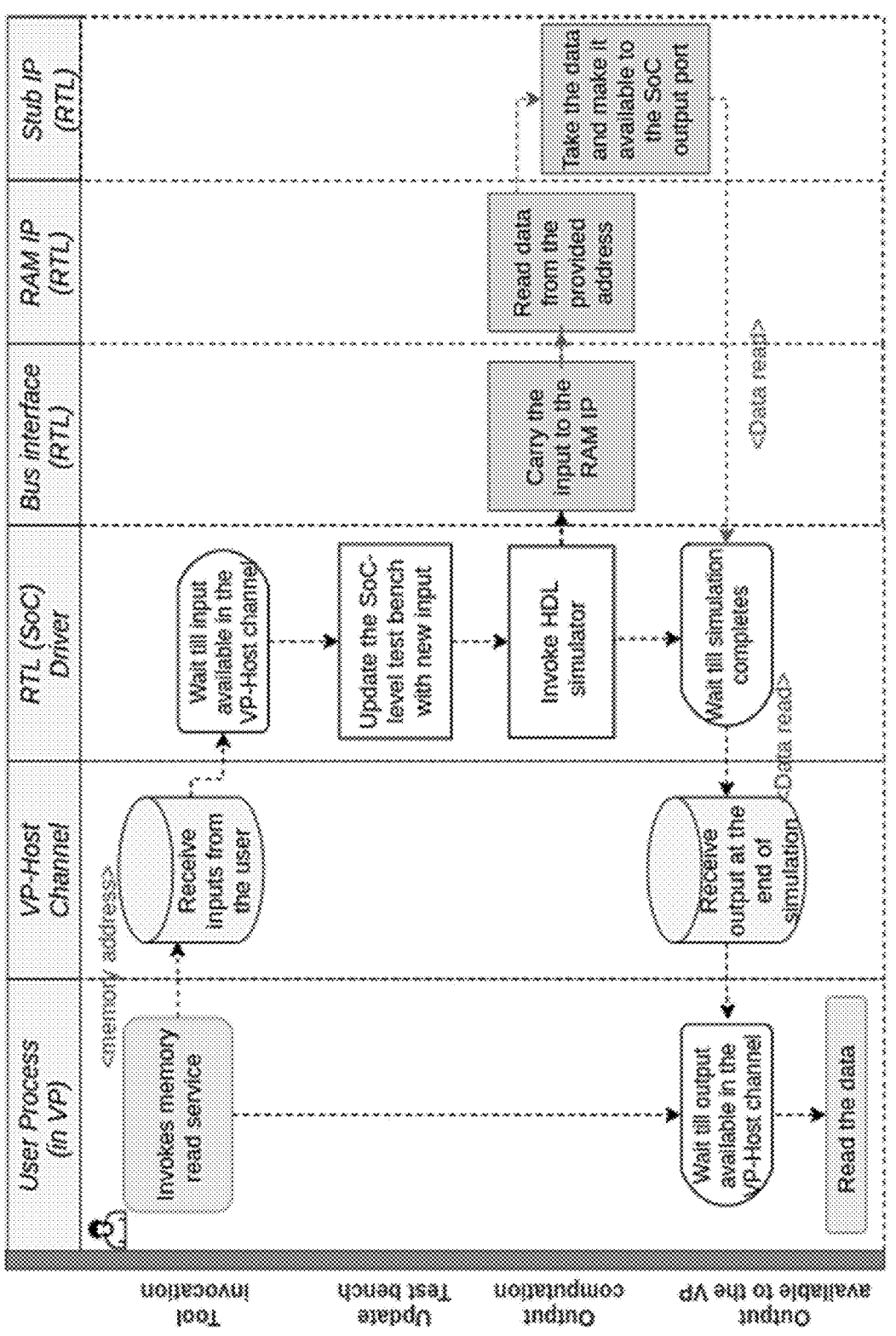
FIG. 6 is a flow diagram of a use case demonstration exercising RAM IP (RTL) in accordance with embodiments of the present disclosure.

Accordingly, FIG. 6 is a flow diagram demonstrating how a user reads memory leveraging a virtual SoC environment including RAM IP (RTL) in accordance with embodiments of the present disclosure. As depicted in the figure, when the user exercises the VirSoC environment, specifically the RAM IP, to read from a specific address, the user is prompted to provide a valid address in the RAM to perform a read from that address. The input or the address is updated in the SoC-level testbench, and upon invocation of the RTL simulator, the data located in that address is read. Whenever there is a new input/address, the prototype tool will replace the previous input in the SoC-level testbench and invoke the RTL simulator. The data that is read is carried by the prototype tool from the stub IP and dumped into the shared space. Then, the VP on the other side picks it up and reads the data making it available to the user.

On the other hand, if there is a write operation, i.e., the processor wants to perform a write, the prototype tool is configured to provide the data and a destination address. The prototype tool receives the SoC-specific information through the configuration file and forms the platform with an SoC-level testbench. When the user provides the address and data from the VP side, the prototype tool carries them via the shared space to the SoC and replaces the current inputs in the SoC-level testbench with the provided inputs. Then, the prototype tool writes the data to that specific address. If the user wants to verify the data written, the user can perform a write followed by a read providing the same address, as previously discussed.

A final use-case involves a QEMU-x86 virtual IP interacting with an IIR (Infinite Impulse Response) IP in RTL. At first, the prototype tool is provided with the configuration file indicating the locations of IPs and IP-level testbenches. Then, the prototype tool uses the information to generate the required platform: an SoC with IIR IP, a shared channel among the VP, the SoC, and the SoC level testbench, forming a virtual SoC environment. The prototype tool instantiates a stub IP in the SoC for the QEMUx86 VP, and the SoC testbench includes all IP-specific test functions extending them to SoC-level, i.e., interfacing them via the bus fabric.

Figure 7:
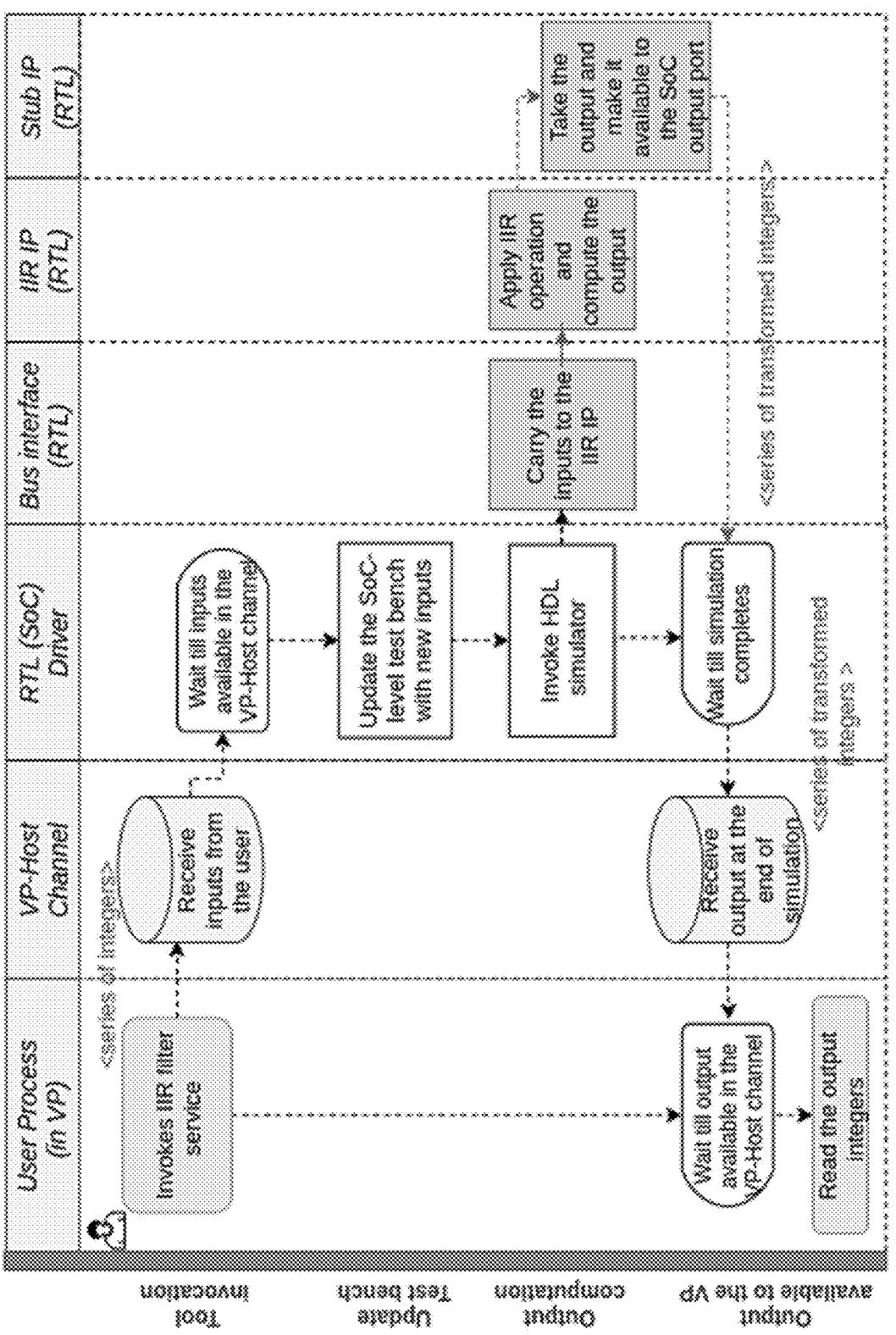
FIG. 7 is a flow diagram of a use case demonstration exercising IIR IP (RTL) in accordance with embodiments of the present disclosure.

FIG. 7 is a flow diagram of a use case demonstration exercising IIR IP (RTL) in accordance with embodiments of the present disclosure. In this specific use-case, the IIR IP takes a series of input samples from which it calculates the output samples. After the VirSoC platform generation, the user is prompted to provide the input samples of the IIR filter as if they were coming from the VP. The inputs traverse through the shared interface and are placed in the generated SoC testbench by the tool. The testbench applies the input samples to the SoC and eventually to the destination IP, IIR, using the RTL simulator. When the output samples are generated, the stub IP dumps them to the shared channel. Finally, the user reads the outputs picked up by the tool from the VP side.

An objective of the present disclosure is to map the use-cases discussed above in a conventional RTL simulation environment and estimate the time required in RTL simulation. However, since the use-case scenarios devised in virtual SoC environments host the virtual components on a guest OS, we must include the time to boot the OS in RTL simulation cycles which is comparable to the total simulation time (as it usually takes considerably more processor instructions to boot an OS than executing a regular software application). Therefore, the amount of instructions that get executed while booting (total instruction count) and the execution time per instruction (cycles per instruction times frequency) are considered for estimating the RTL simulation time. To determine the instruction count, QEMU (Quick EMUlator) TCG (tiny code generator) plugins are used. Additionally, the cycles per instruction (CPI) and time (seconds) per cycle for the x86 processor are estimated.

For example, it takes 893365348 instructions to boot the guest OS. Apparently, different instructions will have different execution times. Given that it will take at least one cycle per instruction, the average execution time is considered to be 1 CPI. Since the execution frequency is known to be in the range of hertz, the simulation time per cycle can be inferred as 1 Hz. Hence, RTL simulation time can be estimated as follows:

$$\text{Simulation time} = \text{Total instruction count} \times \text{execution time per instruction}$$

$$= \text{Total instruction count} \times CPI \times \text{seconds per cycle}$$

$$= 893365348 \times 1 \ CPI \times 1 \ \text{Hz}$$

$$= 893365348 \ \text{seconds} \cong 28 \ \text{years}.$$

The RTL simulation speed is expected to be some magnitude lower than that of virtual SoC environments. FIG. 8 (Table 1) provides a comparison between the performance of VirSoC generated virtual SoC environments and the corresponding RTL environments in terms of simulation speed. While virtual SoC environments execute within a few seconds, it takes years to complete the RTL simulation. Thus, virtual SoC environments are crucial in enabling reasonably higher verification speed leveraging virtual platforms.

In brief, systems and methods of the present disclosure differ from pre-existing approaches in several ways. First, the present disclosure enables the creation of a hybrid virtual system environment that includes different abstractions of IPs with a specified communication protocol and promotes a hybrid virtual platform to an SoC environment, allowing various design abstractions. Such environments can act as validation platforms, enabling perform testing, such as fuzzing and concolic testing. Thus, the present disclosure provides an early software design or verification platform by integrating design components in different abstractions in SoC environments.

In summary, SoC/system-level validation is a complex problem that requires a robust solution. Existing prototyping solutions are inadequate to account for the system-level validation requirements, and some of them require extensive cost or human effort. However, the exemplary solution of systems and methods of the present disclosure provides scope for early validation by forming different kinds of virtual SoC environments with different abstractions. Such platforms can be exploited at the pre-silicon phase irrespective of the maturity level of each IP. And, one can leverage the simulation speed of higher-level abstractions combined with lower-level design prototypes. Although connecting different prototypes might pose as being difficult, the automated framework of the present disclosure efficiently combines them into SoC environments provided that there are communicating linkages among the different abstractions.

Correspondingly, the present disclosure introduces a novel architecture and process to automatically create virtual SoC environments that integrate design blocks at software, hardware, or silicon implementations. An exemplary process involves integrating these components with appropriate specification collateral and generating an SoC environment.

In accordance with various embodiments, a system of one or more computers can be configured to perform particular operations or actions described herein, by virtue of having software, firmware, hardware, or a combination of software, firmware, and hardware. One or more computer programs can be configured to perform particular operations or actions by virtue of including instructions that, when executed by data processing apparatus, cause the apparatus to perform the actions. The system can include one or more computing devices, with hardware processors and memory devices. The system can also include program instructions executable in the computing devices that, when executed by the computing devices, cause the computing devices to perform particular operations or actions described herein. Other embodiments can include corresponding computer systems, apparatus, and computer programs recorded on one or more computer storage devices, each configured to perform the actions of the methods.

Figure 9:
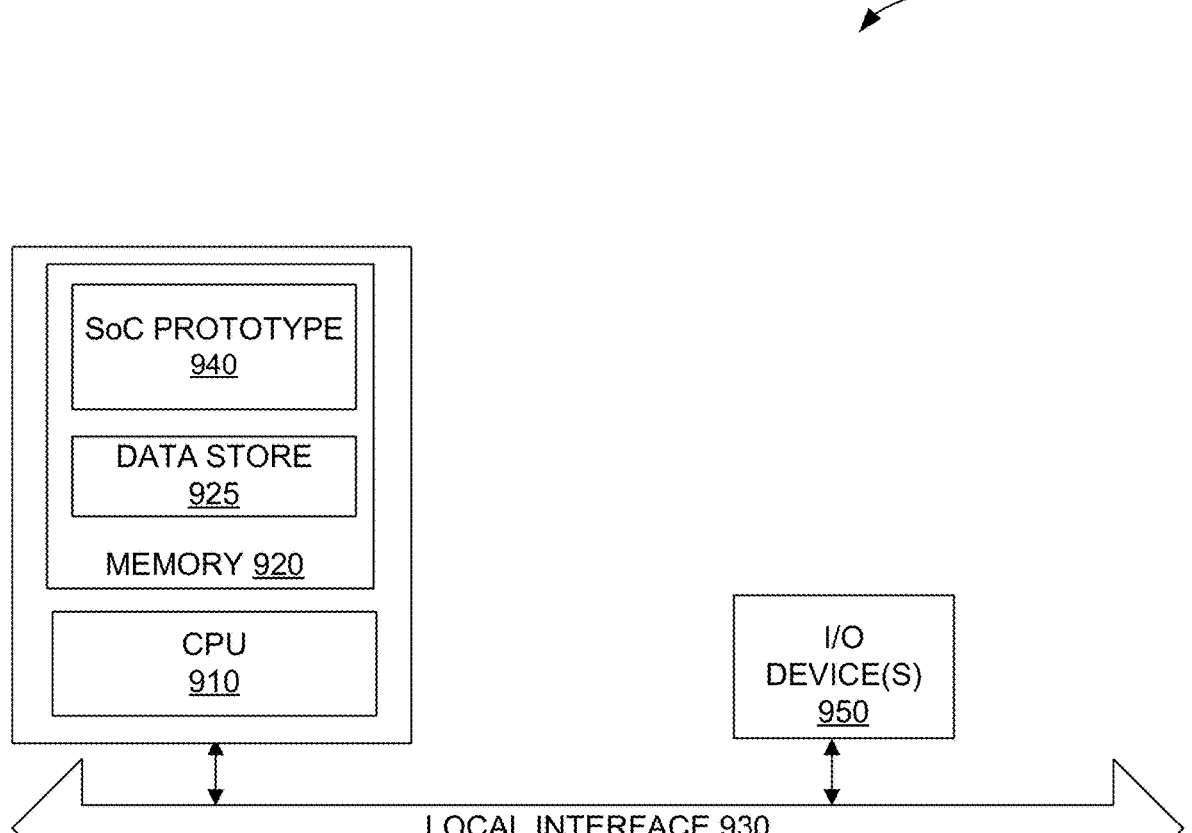
FIG. 9 is a block diagram illustrating an exemplary computing system that can be utilized for systems and methods of the present disclosure.

Accordingly, FIG. 9 is a block diagram illustrating an exemplary computing system or device 900 that can be utilized for systems and methods of the present disclosure. Computing system 900 includes at least one processor 910, e.g., a central processing unit (CPU), coupled to memory elements 920 through a data bus or local interface 930 or other suitable circuitry. Computing system 900 stores program code within memory elements 920. Processor 910 executes the program code accessed from memory elements 920 via the local interface 930. In one aspect, computing system 900 may be implemented as a computer or other data processing system, including tablets, smartphones, or server computers that are accessed using browsers at client computers. It should be appreciated, however, that computing system 900 can be implemented in the form of any system including a processor and memory that is capable of performing the functions described within this disclosure.

Memory elements 920 include one or more physical memory devices such as, for example, a local memory and one or more storage devices. Local memory refers to random access memory (RAM) or other non-persistent memory device(s) generally used during actual execution of the program code. Storage device may be implemented as a hard disk drive (HDD), solid state drive (SSD), or other persistent data storage device. Computing system 900 may also include one or more cache memories (not shown) that provide temporary storage of at least some program code in order to reduce the number of times program code must be retrieved from storage device during execution.

Stored in the memory 920 are both data and several components that are executable by the processor 910. In particular, stored in the memory 920 and executable by the processor 910 are code 940 for SoC prototyping by forming a virtual SoC environment. Also stored in the memory 920 may be a data store 925 and other data. The data store 925 can include an electronic repository or database relevant to validating an SoC and forming a VirSoc environment. In addition, an operating system may be stored in the memory 920 and executable by the processor 910. In an embodiment, configuration file(s) are stored in the data store 925.

Input/output (I/O) devices 950 such as a keyboard, a display device, and a pointing device may optionally be coupled to computing system 900. The I/O devices may be coupled to computing system 900 either directly or through intervening I/O controllers. A network adapter may also be coupled to computing system to enable computing system to become coupled to other systems, computer systems, remote printers, and/or remote storage devices through intervening private or public networks. Modems, cable modems, Ethernet cards, and wireless transceivers are examples of different types of network adapter that may be used with computing system 900.

Thus, the embodiments described herein can be implemented in hardware, software, or a combination of hardware and software. If embodied in software, the functions, steps, and elements can be implemented as a module or set of code that includes program instructions to implement the specified logical functions. The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The embodiments can be implemented by at least one processing circuit or device and at least one memory circuit or device. Such a processing circuit can include, for example, one or more processors and one or more storage or memory devices coupled to a local interface. The local interface can include, for example, a data bus with an accompanying address/control bus or any other suitable bus structure. The memory circuit can store data or components that are executable by the processing circuit.

If embodied as hardware, the functions, steps, and elements can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any functions, steps, and elements described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The invention claimed is:

1. A method for performing a simulation on a hybrid virtual system-on-chip (SoC) model, comprising:

receiving, by a computing device, a configuration file having specifications for the hybrid virtual system-on-chip (SoC) model, wherein the specifications identify (a) one or more hardware circuitry blocks designed as register transfer level (RTL) abstractions that are present in the system-on-chip model; (b) one or more hardware circuitry blocks designed as virtual prototype abstractions; (c) unit-level testbenches for the one or more hardware circuitry blocks designed as the RTL abstractions; (d) place holder variables in the unit-level testbenches; and (e) a shared interface among the one or more hardware circuitry blocks designed as RTL abstractions and the one or more hardware circuitry blocks designed as virtual prototype abstractions;

creating, by the computing device, the hybrid virtual SoC model based on the configuration file by instantiating the one or more hardware circuitry blocks designed as RTL abstractions and a stub hardware circuitry block for each of the one or more hardware circuitry blocks designed as virtual prototype abstractions, wherein the RTL abstracted hardware circuitry blocks and each stub hardware circuitry block are connected via the shared interface; and generating, by the computing device, a SoC-level testbench by integrating the unit-level testbenches for the one or more hardware circuitry blocks represented as RTL abstractions, wherein the SoC-level testbench is configured to receive inputs via the shared interface.

2. The method of claim 1, wherein a communication fabric connecting the RTL abstraction comprises a bus-based communicating interface.

3. The method of claim 1, wherein a communication fabric connecting the RTL abstraction comprises a network-based communicating interface.

4. The method of claim 1, wherein the specifications further identify one or more hardware circuitry blocks designed as field programmable gate array (FPGA) abstractions, wherein the FPGA abstracted hardware circuitry blocks are interfaced with the shared interface.

5. The method of claim 1, further comprising simulating the hybrid virtual SoC model with input from the SoC-level testbench.

6. The method of claim 1, wherein the simulating the hybrid virtual SoC model comprises:

receiving a user-provided input for processing by the hybrid virtual SoC model;

replacing a place holder variable in the SoC-level testbench with the user-provided input; and invoking, by the SoC-level testbench, the one or more instantiated RTL abstracted hardware circuitry blocks.

7. The method of claim 6, further comprising:

passing, by the SoC-level testbench, an output of the one or more instantiated RTL abstracted hardware circuitry blocks to the stub hardware circuitry block; and outputting, by the stub hardware circuitry block, the output to the shared interface.

8. The method of claim 7, further comprising:

receiving, by the one or more virtual prototype abstracted hardware circuitry blocks, the output from the shared interface; and presenting, by the one or more virtual prototype abstracted hardware circuitry blocks, the output for display on the computing device.

9. The method of claim 1, further comprising providing the computing device with a host operating system and a guest operating system, wherein the RTL abstracted hardware circuitry blocks are executed by the host operating system and the virtual prototype abstracted hardware circuitry blocks are executed by the guest operating system.

10. A system comprising:

a memory of a computing device storing computer-executable instructions; and one or more hardware processors of the computing device coupled to the memory and configured to:

receiving a configuration file having specifications for a hybrid virtual system-on-chip (SoC) model, wherein the specifications identify (a) one or more hardware circuitry blocks designed as register transfer level (RTL) abstractions that are present in the system-on-chip model; (b) one or more hardware circuitry blocks designed as virtual prototype abstractions; (c) unit-level testbenches for the one or more hardware circuitry blocks designed as the RTL abstractions; (d) place holder variables in the unit-level testbenches; and (e) a shared interface among the one or more hardware circuitry blocks designed as RTL abstractions and the one or more hardware circuitry blocks designed as virtual prototype abstractions;

creating the hybrid virtual SoC model based on the configuration file by instantiating the one or more hardware circuitry blocks designed as RTL abstractions and a stub hardware circuitry block for each of the one or more hardware circuitry blocks designed as virtual prototype abstractions, wherein the RTL abstracted hardware circuitry blocks and each stub hardware circuitry block are connected via the shared interface; and generating a SoC-level testbench by integrating the unit-level testbenches for the one or more hardware circuitry blocks represented as RTL abstractions, wherein the SoC-level testbench is configured to receive inputs via the shared interface.

11. The system of claim 10, wherein a communication fabric connecting the RTL abstraction comprises a bus-based communicating interface.

12. The system of claim 10, wherein a communication fabric connecting the RTL abstraction comprises a network-based communicating interface.

13. The system of claim 10, wherein the specifications further identify one or more hardware circuitry blocks designed as field programmable gate array (FPGA) abstractions, wherein the FPGA abstracted hardware circuitry blocks are interfaced with the shared interface.

14. The system of claim 10, wherein the one or more hardware processors are further configured to simulate the hybrid virtual SoC model with input from the SoC-level testbench.

15. The system of claim 14, wherein simulation of the hybrid virtual SoC model comprises:

receiving a user-provided input for processing by the hybrid virtual SoC model;

replacing a place holder variable in the SoC-level testbench with the user-provided input; and invoking, by the SoC-level testbench, the one or more instantiated RTL abstracted hardware circuitry blocks.

16. The system of claim 15, wherein the one or more hardware processors are further configured to:

pass, by the SoC-level testbench, an output of the one or more instantiated RTL abstracted hardware circuitry blocks to the stub hardware circuitry block; and output, by the stub hardware circuitry block, the output to the shared interface.

17. The system of claim 16, wherein the one or more hardware processors are further configured to:

receive, by the one or more virtual prototype abstracted hardware circuitry blocks, the output from the shared interface; and present, by the one or more virtual prototype abstracted hardware circuitry blocks, the output for display on the computing device.

18. The system of claim 10, wherein the computing device comprises a host operating system and a guest operating system, wherein the RTL abstracted hardware circuitry blocks are executed by the host operating system and the virtual prototype abstracted hardware circuitry blocks are executed by the guest operating system.

19. A non-transitory computer-readable storage medium having instructions stored therein, wherein the instructions, when executed by a processor, cause the processor to:

receive a configuration file having specifications for a hybrid virtual system-on-chip (SoC) model, wherein the specifications identify (a) one or more hardware circuitry blocks designed as register transfer level (RTL) abstractions that are present in the system-on-chip model; (b) one or more hardware circuitry blocks designed as virtual prototype abstractions; (c) unit-level testbenches for the one or more hardware circuitry blocks designed as the RTL abstractions; (d) place holder variables in the unit-level testbenches; and (e) a shared interface among the one or more hardware circuitry blocks designed as RTL abstractions and the one or more hardware circuitry blocks designed as virtual prototype abstractions;

create the hybrid virtual SoC model based on the configuration file by instantiating the one or more hardware circuitry blocks designed as RTL abstractions and a stub hardware circuitry block for each of the one or more hardware circuitry blocks designed as virtual prototype abstractions, wherein the RTL abstracted hardware circuitry blocks and each stub hardware circuitry block are connected via the shared interface; and generate a SoC-level testbench by integrating the unit-level testbenches for the one or more hardware circuitry blocks represented as RTL abstractions, wherein the SoC-level testbench is configured to receive inputs via the shared interface.

20. The non-transitory computer-readable storage medium of claim 19, wherein the processor is further configured to simulate the hybrid virtual SoC model with input from the SoC-level testbench.

* * * * *